(12) United States Patent
Brown et al.

(10) Patent No.: US 8,634,139 B1
(45) Date of Patent: Jan. 21, 2014

(54) SYSTEM FOR AND METHOD OF CATADIOPTRIC COLLIMATION IN A COMPACT HEAD UP DISPLAY (HUD)

(75) Inventors: Robert D. Brown, Lake Oswego, OR (US); Kurt A. Stahl, Portland, OR (US); Lu Bai, Wilsonville, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 172 days.

(21) Appl. No.: 13/250,621

(22) Filed: Sep. 30, 2011

(51) Int. Cl.
*G02B 27/14* (2006.01)

(52) U.S. Cl.
CPC .................................. *G01B 27/0172* (2013.01)
USPC ............................ 359/631; 359/630; 359/634

(58) Field of Classification Search
USPC .................................... 359/629, 630, 631, 634
See application file for complete search history.

(56) References Cited

U.S. PATENT DOCUMENTS

| | | | |
|---|---|---|---|
| 4,309,070 A | 1/1982 | St. Leger Searle | |
| 4,711,512 A | 12/1987 | Upatnieks | |
| 5,341,230 A | 8/1994 | Smith | |
| 5,408,346 A * | 4/1995 | Trissel et al. ................. | 349/115 |
| 6,169,613 B1 | 1/2001 | Amitai et al. | |
| 6,392,812 B1 | 5/2002 | Howard | |
| 6,757,105 B2 | 6/2004 | Niv et al. | |
| 6,829,095 B2 | 12/2004 | Amitai | |
| 6,847,488 B2 | 1/2005 | Travis | |
| 7,021,777 B2 | 4/2006 | Amitai | |
| 7,123,418 B2 | 10/2006 | Weber et al. | |
| 7,319,573 B2 | 1/2008 | Nishiyama | |
| 7,391,573 B2 | 6/2008 | Amitai | |
| 7,457,040 B2 | 11/2008 | Amitai | |
| 7,573,640 B2 | 8/2009 | Nivon et al. | |
| 7,576,916 B2 | 8/2009 | Amitai | |
| 7,577,326 B2 | 8/2009 | Amitai | |
| 7,643,214 B2 | 1/2010 | Amitai | |
| 7,672,055 B2 | 3/2010 | Amitai | |
| 7,724,441 B2 | 5/2010 | Amitai | |
| 7,724,442 B2 | 5/2010 | Amitai | |
| 7,724,443 B2 | 5/2010 | Amitai | |
| 7,733,572 B1 * | 6/2010 | Brown et al. ................. | 359/631 |
| 7,751,122 B2 | 7/2010 | Amitai | |
| 7,884,985 B2 | 2/2011 | Amitai et al. | |
| 7,907,342 B2 | 3/2011 | Simmonds et al. | |
| 8,233,204 B1 | 7/2012 | Robbins et al. | |
| 2008/0106775 A1 | 5/2008 | Amitai et al. | |
| 2008/0151379 A1 | 6/2008 | Amitai | |
| 2008/0186604 A1 | 8/2008 | Amitai | |
| 2008/0198471 A1 | 8/2008 | Amitai | |
| 2008/0278812 A1 | 11/2008 | Amitai | |

(Continued)

OTHER PUBLICATIONS

Cameron, A., The Application of Holographic Optical Waveguide Technology to Q-Sight™ Family of Helmet Mounted Displays, Proc. of SPIE, 2009, 11 pages, vol. 7326.

(Continued)

*Primary Examiner* — William Choi
(74) *Attorney, Agent, or Firm* — Donna P. Suchy; Daniel M. Barbieri

(57) ABSTRACT

A head up display can use a catadioptric collimating system. The head up display includes an image source. The head up display also includes a collimating mirror, and a polarizing beam splitter. The light from the image source enters the beam splitter and is reflected toward the collimating mirror. The light striking the collimating mirror is reflected through the beam splitter toward a combiner. A corrective lens can be disposed after the beam splitter.

20 Claims, 5 Drawing Sheets

(56) References Cited

U.S. PATENT DOCUMENTS

| | | |
|---|---|---|
| 2008/0285140 A1 | 11/2008 | Amitai |
| 2009/0019222 A1 | 1/2009 | Verma et al. |
| 2009/0052046 A1 | 2/2009 | Amitai |
| 2009/0052047 A1 | 2/2009 | Amitai |
| 2009/0097127 A1 | 4/2009 | Amitai |
| 2009/0122414 A1 | 5/2009 | Amitai |
| 2009/0153437 A1 | 6/2009 | Aharoni |
| 2009/0237804 A1 | 9/2009 | Amitai et al. |
| 2010/0171680 A1 | 7/2010 | Lapidot et al. |
| 2010/0246004 A1 | 9/2010 | Simmonds |
| 2010/0246993 A1 | 9/2010 | Rieger et al. |
| 2011/0026128 A1 | 2/2011 | Baker et al. |
| 2011/0050548 A1 | 3/2011 | Blumenfeld et al. |

OTHER PUBLICATIONS

Wisely, P.L., Head up and head mounted display performance improvements through advanced techniques in the manipulation of light, Proc. of SPIE, 2009, 10 pages, vol. 7327.

* cited by examiner

SYSTEM FOR AND METHOD OF CATADIOPTRIC COLLIMATION IN A COMPACT HEAD UP DISPLAY (HUD)

CROSS REFERENCE TO RELATED APPLICATIONS

The present application is related to: U.S. patent application Ser. No. 13/250,940, entitled, "Head Up Display (HUD) Utilizing Diffractive Gratings Having Graded Efficiency," filed on an even date herewith, incorporated herein by reference in its entirety, and assigned to the assignee of the present application; U.S. patent application Ser. No. 13/250,858, entitled, "Ultra-Compact HUD Utilizing Waveguide Pupil Expander With Surface Relief Gratings In High Refractive Index Materials," filed on an even date herewith, incorporated herein by reference in its entirety, and assigned to the assignee of the present application; U.S. patent application Ser. No. 13/251,087, entitled, "System for and Method of Extending Vertical Field of View in Head Up Display Utilizing a Waveguide Combiner," filed on an even date herewith, incorporated herein by reference in its entirety, and assigned to the assignee of the present application; U.S. patent application Ser. No. 13/250,970, entitled, "System For and Method of Stowing HUD Combiners," filed on an even date herewith and assigned to the assignee of the present application, incorporated herein by reference in its entirety; and U.S. patent application Ser. No. 13/250,994, entitled, "Compact Head Up Display (HUD) for Cockpits with Constrained Space Envelopes," filed on an even date herewith, incorporated herein by reference herein in its entirety and assigned to the assignee of the present application.

BACKGROUND OF THE INVENTION

The present specification relates to displays. More particularly, the present specification relates to head up displays (HUDs).

HUDs provide significant safety and operational benefits including precise energy management and conformal flight paths. These safety and operational benefits are enjoyed by operators of air transport aircraft, military aircraft, regional aircraft and high end business jets where HUD are generally employed. These safety and operational benefits are also desirable in smaller aircraft.

Conventional HUDs are generally large, expensive and difficult to fit into smaller aircraft, such as, business and regional jets as well as general aviation airplanes. Often, conventional HUDs rely on large optical components to form adequate field of view and viewing eye box. The large optical components are often associated with collimating or non-collimating projectors and include lens, prisms, mirrors, etc. The volume of the packages including the optical components of the HUD are too large to fit within the constrained space in the cockpit of smaller aircraft. Further, conventional HUDs rely upon optical components which are generally too expensive for the cost requirements of smaller aircraft.

Substrate guided HUDs have been proposed which use waveguide technology with diffraction gratings to preserve eye box size while reducing size of the HUD. U.S. Pat. No. 4,309,070 issued St. Leger Searle and U.S. Pat. No. 4,711,512 issued to Upatnieks disclose substrate waveguide HUDS. However, such systems have faced difficulties in design.

Therefore, there is a need for a compact HUD for small aircraft, such as small business jets. Further, there is a need for a compact HUD which uses collimating optics optimized for constrained spaces associated with smaller aircraft. Yet further still, there is also a need for a small volume, lightweight, lower cost collimating optics. Yet further, there is a need for a low parts count collimating system for a substrate waveguide HUD. Still further, there is a need for collimating optics with a short focal length and a low F ratio.

SUMMARY OF THE INVENTION

An exemplary embodiment relates to a head up display. The head up display is for use with an image source. The head up display includes a collimating mirror, and a polarizing beam splitter. Light from the image source enters the beam splitter and is reflected toward the collimating mirror. The light strikes the collimating mirror and transmits through the beam splitter toward a combiner.

Another exemplary embodiment relates to a method of providing information to a pilot. The method includes providing light from an image source to field lens, providing the light through a polarizing beam splitter to a collimating mirror, and providing light reflected from the collimating mirror through the polarizing beam splitter to a corrective lens. The method also includes providing the light from the corrective lens as collimated light to a wave guide.

Another embodiment relates to a catadioptric optical system for a head up display including an image source. The optical system includes a first lens, a polarizing beam splitter, a collimating mirror, and a corrective lens.

BRIEF DESCRIPTION OF THE DRAWINGS

Exemplary embodiments are hereafter described with reference to the accompanying drawings, wherein like numerals denote like elements; and.

DETAILED DESCRIPTION OF THE PREFERRED EMBODIMENTS

Figure 1:
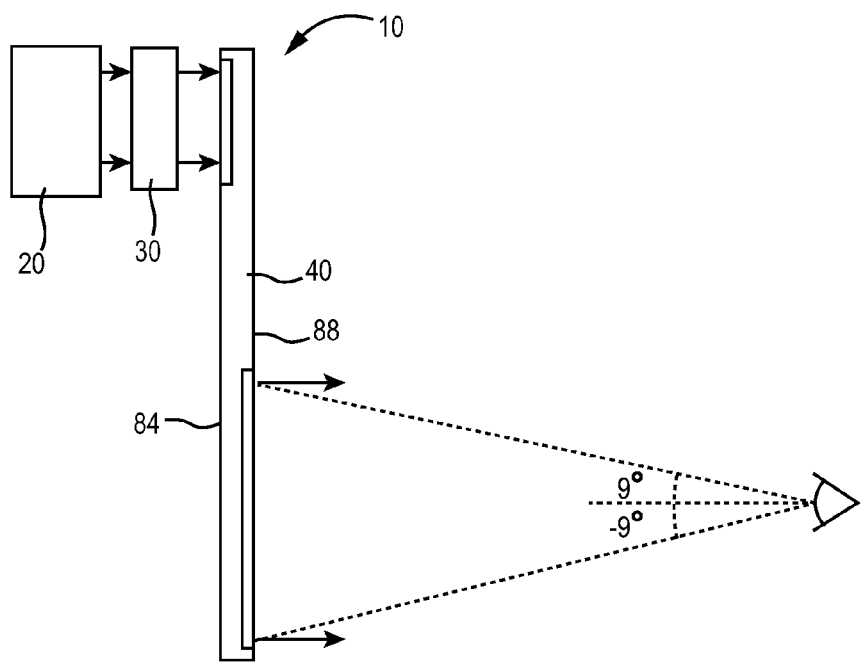
FIG. 1 is a general block diagram of a head up display (HUD) system in accordance with an exemplary embodiment.
Figure 2:
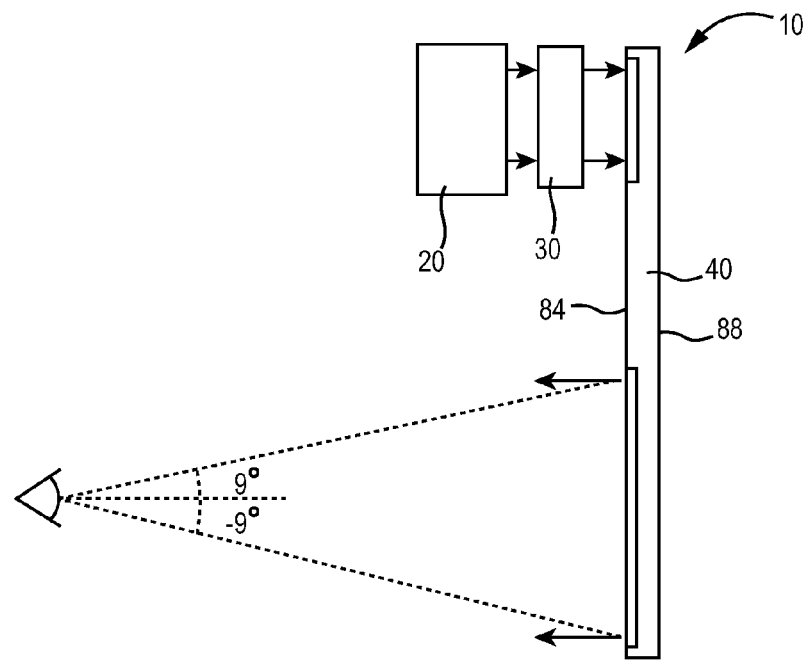
FIG. 2 is a general block diagram of a HUD system in accordance with another exemplary embodiment.

Before describing in detail the particular improved system and method, it should be observed that the invention includes, but is not limited to, a novel structural combination of optical components and not in the particular detailed configurations thereof. Accordingly, the structure, methods, functions, control and arrangement of components have been illustrated in the drawings by readily understandable block representations and schematic drawings, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

With reference to FIG. 1, head up display (HUD) system 10 can be utilized in various applications, including aviation, medical, naval, targeting, ground based, military, etc. HUD system 10 is preferably configured for use in smaller cockpit environments and yet provides an appropriate field of view and eye box for avionic applications.

HUD system 10 preferably includes an image source 20 and a substrate waveguide 40. Image source 20 can be any device for providing an image including but not limited to a CRT display, an LED display, an active matrix liquid crystal display (LCD), etc. In a preferred embodiment, image source 20 is a micro LCD assembly and can provide linearly polarized light.

In addition, system 10 can include collimating optics 30 disposed between substrate waveguide 40 and image source 20. Collimating optics 30 can be a single optical component, such as a lens, or include multiple optical components. In one embodiment, collimating optics 30 are configured as a catadioptric collimator as described with reference to FIG. 6. Collimating optics 30 can be any optical component or configuration of optical components that provide light (preferably collimated light) from image source 20 to substrate waveguide 40. Collimating optics 30 can be integrated with or spaced apart from image source 20 and/or substrate waveguide 40.

In operation, system 10 provides images from image source 20 to a pilot or other operator so that the pilot can simultaneously view the images and a real world scene. The images can include graphic and/or text information (e.g., flight path vector, etc.) related to avionic information in one embodiment. In addition, the images can include synthetic or enhanced vision video images. In one embodiment, collimated light representing the image from image source 20 is provided on substrate waveguide 40 so that the pilot can view the image conformally on the real world scene through substrate waveguide 40. Waveguide 40 is preferably transparent for viewing the real world scene through main surfaces or sides 84 and 88.

Figure 3:
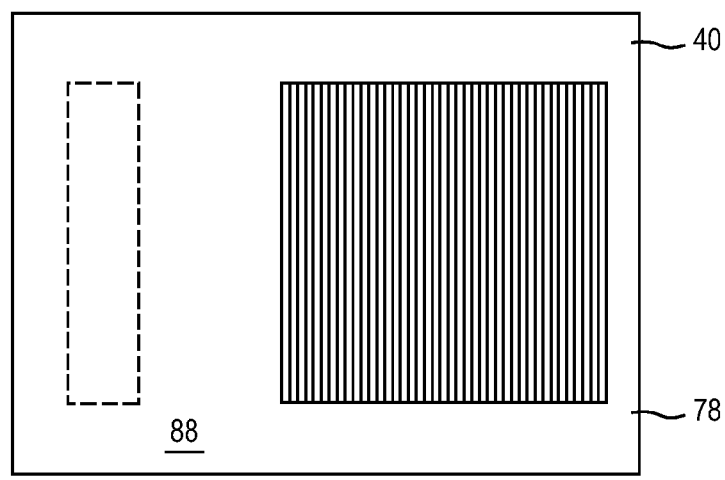
FIG. 3 is a top view schematic drawing of a waveguide for the system illustrated in FIG. 1 in accordance with yet another exemplary embodiment.
Figure 4:
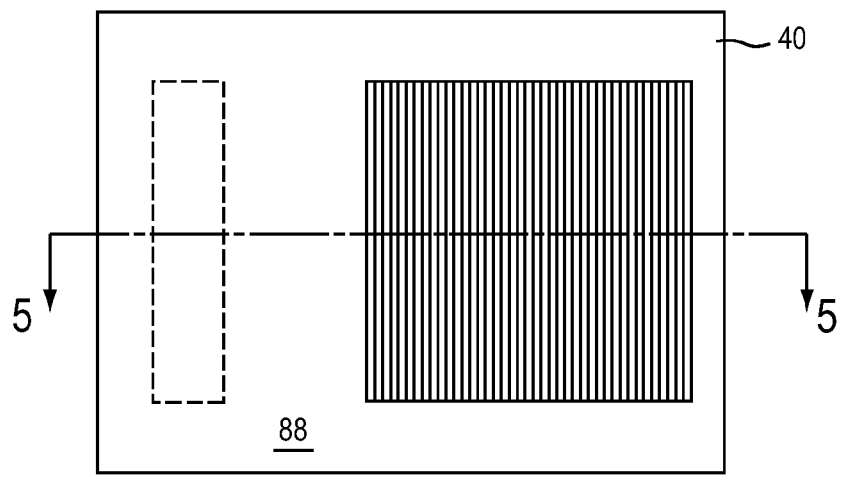
FIG. 4 is a top view schematic drawing of a waveguide for the system illustrated in FIG. 1 in accordance with still another exemplary embodiment.
Figure 5:
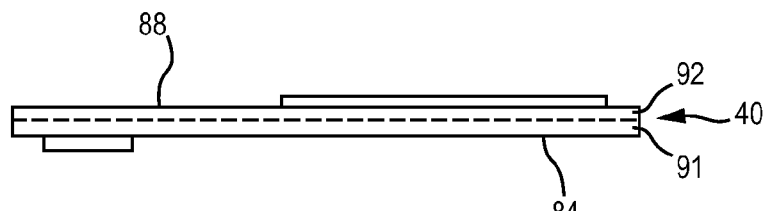
FIG. 5 is a cross sectional view schematic drawing of the waveguide illustrated in FIG. 4 along line 5-5.

With reference to FIG. 3, a single glass plate 78 of inorganic glass material is utilized for substrate waveguide 40. With reference to FIGS. 4 and 5, substrate waveguide 40 can be made from two equal sized Schott N-Lak8 glass plates 91 and 92 adhered together by optical adhesive or contact bond in one embodiment. Glass plates 78, 91 and 92 can be rectangular in cross-sectional area.

In one preferred embodiment, system 10 is configured to expand the pupil of system 10 in a single axis (e.g., in the vertical direction). In one embodiment, substrate waveguide 40 provides an approximately 100 mm vertical×75 mm horizontal exit pupil. Waveguide 40 can effect the single axis pupil expansion. The single axis expansion can be on the order of 3 to 8 times (e.g, approximately 5.8 times in one preferred embodiment). Other orders of pupil expansion are possible depending upon performance criteria, design parameters, and optical components utilized without departing from the scope of the invention.

Figure 6:
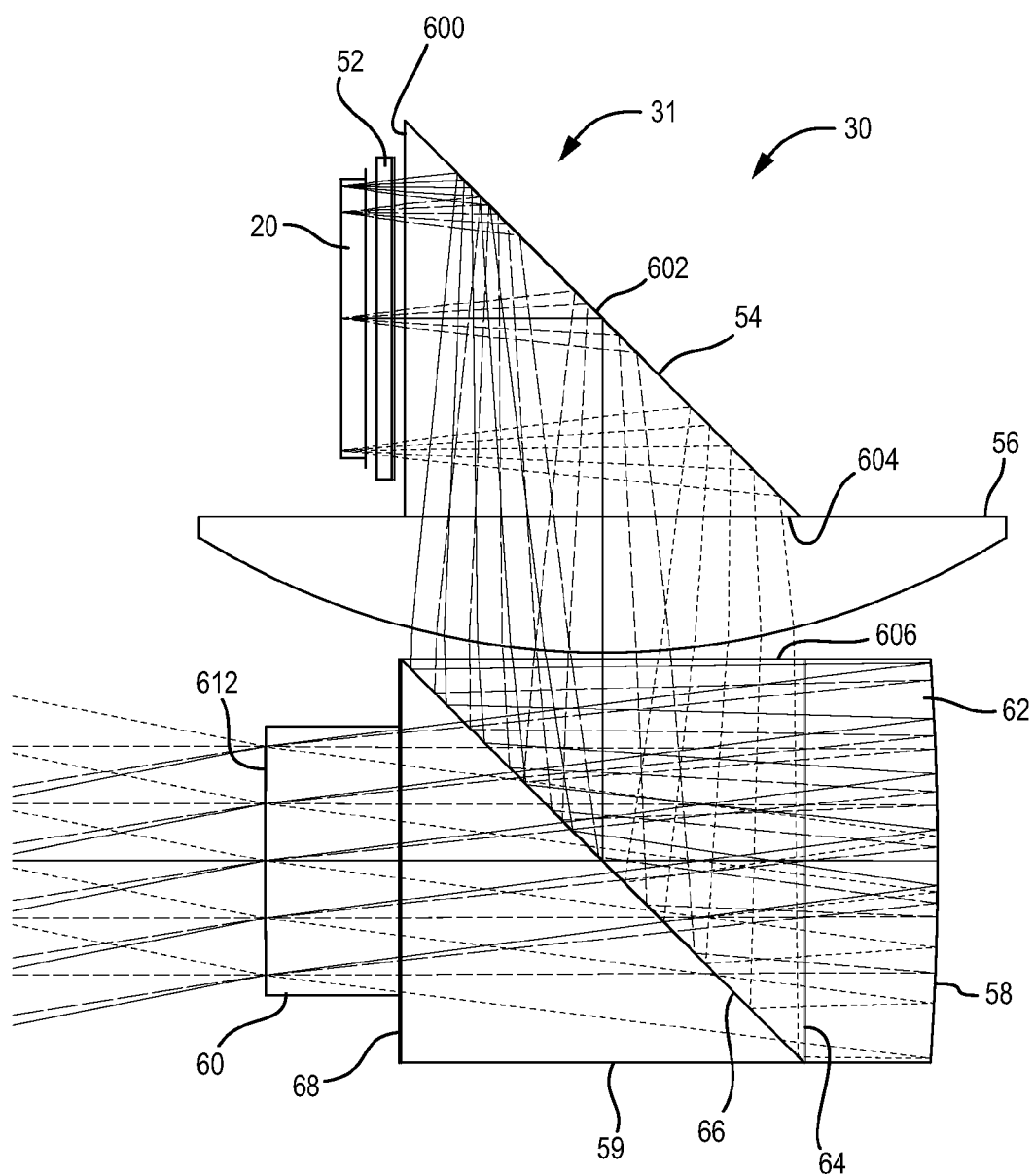
FIG. 6 is a side view schematic drawing of collimating optics for the system illustrated in FIG. 1 in accordance with another exemplary embodiment.

With reference to FIG. 6, collimating optics 30 can be an assembly 31 disposed adjacent to image source 20 in accordance with on embodiment. Assembly 31 of collimating optics 30 is preferably a catadioptric folded collimator system and includes a fold prism 54, a field lens 56, a beam splitter 59, a curved mirror 58 and a corrective lens 60. Corrective lens 60 is disposed to provide collimated light to diffraction grating 42 (FIG. 1). Fold prism 54 receives polarized light from image source 20 at a face 600.

The light received at face 600 from image source 20 is reflected from a surface 602 of prism 54 to an exit surface 604. Exit surface 604 is disposed to provide light to field lens 56. Field lens 56 provides light to an input surface 606 of beam splitter 59. Field lens 56 is preferably configured as a field flattener lens, such as a plano-convex spherical lens. Alternatively, fold prism 54 can be a mirror or include a mirrored surface. In alternative embodiment, fold prism 54 is not required for assembly 31 and lens 64 can receive light directly from image or source 20.

Beam splitter 59 is preferably configured as a polarizing beam splitter. Curved mirror 58 includes a curved reflective surface 62. Surface 62 provides a catoptric element which in conjunction with a refractive (dioptric) element, such as, lens 60, provides a catadioptric system. Corrective lens 60 is preferably an aspheric lens. Curved reflective surface 62 is preferably an aspheric surface.

Beam splitter 59 provides a folded optical path and can include a retarder film 64, an internal partially reflective surface 66 and a retarder film 68. Film 64 can be a quarter wave retarder film, and film 68 can be a one half wave retarder film. Films 68 and 64 preferably control the polarization states for efficient light transmission. Film 68 can be optional depending on polarization characteristics of down stream optics.

Light received at partially reflective internal surface 66 of splitter 59 from input surface 606 is reflected through film 64 to curved surface 62. Light reflecting from surface 62 is provided through film 64, partially reflective internal surface 66, and film 68 to corrective lens 60. A combination of elements in collimating optics 30 collimates light at an exit pupil 612 associated with corrective lens 60. Collimating optics 30 embodied as a catadioptric system advantageously assists in making the design of HUD system 10 nearly 10 times smaller in volume than conventional HUD designs in one embodiment.

Assembly 31 of collimating optics 30 as embodied in FIG. 6 advantageously provides a relatively low optical element count with a short focal length. The f ratio (the ratio of pupil diameter under focal length) is kept very low in a preferred embodiment. In addition, assembly 31 of collimating optics 30 as embodied in FIG. 6 efficiently handles polarized light and provides a compact high performance collimating solution.

As shown in FIG. 6, collimating optics 30 can be similar to a Schmidt camera arrangement in one exemplary embodiment. Preferably, prism 54, lens 56, collimating or curved mirror 58, splitter 59 and lens 60 are cemented together as assembly 31 with film 64 disposed between mirror 58 and beam splitter 59 and film 68 disposed between lens 60 and beam splitter 59. Advantageously, arrangement 31 of collimating optics 30 uses a combination of low f-ratio reflective optics in an on-axis arrangement with polarizing beam splitter 59 and exit pupil 612 being truncated. The low f-ratio optics provides the advantage of achieving a biocular view with image source 20 having a small width. The on-axis arrangement allows excellent aberration correction and low element count. The reflective optics provide low chromatic dispersion and polarizing beam splitter 59 allows optics 30 to be used on axis (no tilted or de-centered elements) while folding image source 20 out of the way and simultaneously providing efficient handling of polarization states in one embodiment.

Figure 8:
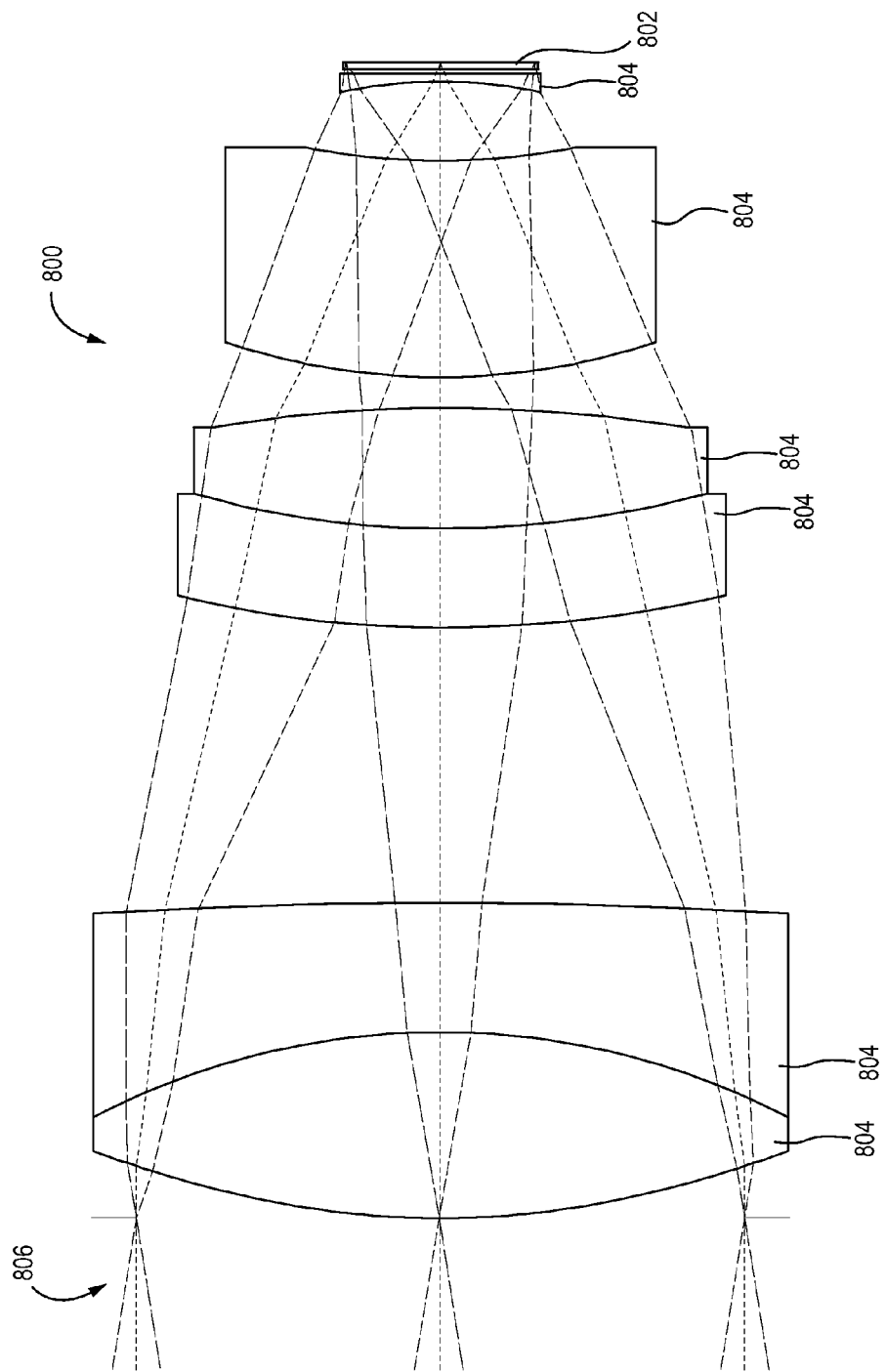
FIG. 8 is a side view schematic drawing of collimating optics for a prior art system.

In contrast, a prior art system may use a refractive collimator 800, as shown in FIG. 8. An image source 802 and a series of refractive lenses 804. The refractive collimator 800 has a relatively high f-ratio (e.g., an f ratio of 1) compared to collimating optics 30 of FIG. 6. The arrangement of optics 30 requires less space from source 20 to exit pupil 612 than collimator 800 requires from image source 802 to an exit pupil 806.

In one embodiment, collimating optics 30 can provide a 30 degree field of view from image source 20 embodied as a 1.3 inch diagonal LCD which translates into a focal length of approximately 2 inches. Exit pupil 612 is preferably wide enough to allow biocular viewing (e.g., approximately 3 inches which forces the f ratio to be approximately 0.67 or ⅔). In one embodiment, optics 30 provide a field of view of 30 degrees horizontally by 22 degrees vertically. An exemplary exit aperture for optics 30 is rectangular having dimensions of 4 inches×1 inch which can be extended to be 4 inches by 4 inches by waveguide 40. Assembly 31 of collimating optics 30 advantageously provides excellent performance, meeting requirements for efficiency, color correction and collimation accuracy.

In one embodiment, exit pupil 612 from lens 60 is truncated to 17 millimeters vertical by 75 millimeters horizontal. This truncation allows system 10 to be folded into a very compact volume. Advantageously, substrate waveguide 40 provides pupil expansion in one direction to achieve a 100 millimeter vertical by 75 millimeter horizontal pupil in one embodiment. Assembly 31 preferably has a cross section that is only approximately 50 millimeters×85 millimeters or less in one embodiment.

Figure 7:
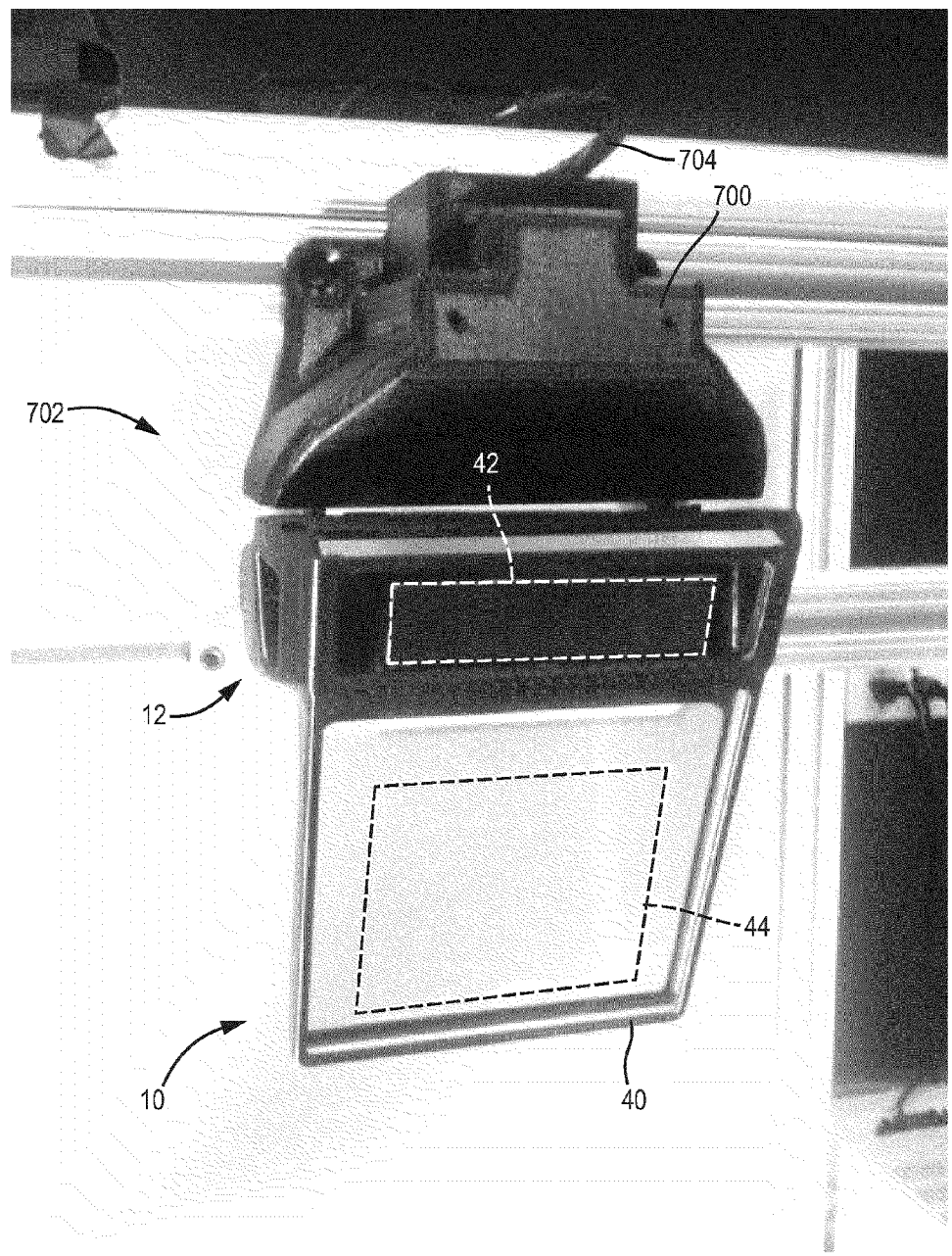
FIG. 7 is a perspective view schematic illustration of an embodiment of the HUD system illustrated in FIG. 1 and attached to a bracket in accordance with another exemplary embodiment.

With reference to FIG. 7, HUD system 10 can be packaged as a compact HUD system 702 including substrate waveguide 40 and a fixed bracket 700. Bracket 700 includes portion 703 including image source 20, and optical components of collimating optics 30. Bracket 700 also includes a portion 702 including the remaining optical components in collimating optics 30. Image source 20 receives data from a HUD computer via wiring 704 associated with bracket 700. Bracket 700 can be coupled to the frame of a cockpit. The specific shape and structure of system 702 is not shown in a limiting fashion.

It is understood that while the detailed drawings, specific examples, material types, thicknesses, dimensions, and particular values given provide a preferred exemplary embodiment of the present invention, the preferred exemplary embodiment is for the purpose of illustration only. The method and apparatus of the invention is not limited to the precise details and conditions disclosed. For example, although specific types of optical component, dimensions and angles are mentioned, other components, dimensions and angles can be utilized. Various changes may be made to the details disclosed without departing from the spirit of the invention which is defined by the following claim.

What is claimed is:

1. A head up display for use with an image source, the head up display comprising:
    a lens:
    a collimating mirror; and
    a polarizing beam splitter, wherein light from the image source enters the beam splitter and is reflected toward the collimating mirror, wherein light striking the collimating mirror is reflected through the beam splitter toward a combiner, wherein the lens and the beam splitter are provided in a package with a cross sectional area of 50×85 mm or less.

2. The head up display of claim 1, wherein the combiner provides vertical pupil expansion.

3. The head up display of claim 2, wherein the image source is a micro liquid crystal display.

4. The head up display of claim 3, further comprising a corrective lens disposed between the combiner and the polarizing beam splitter, wherein the collimating mirror and corrective lens is a catadioptric system.

5. The head up display of claim 1, wherein the lens is a field lens disposed between a first face of the beam splitter and the image source, wherein the light reflected toward the collimating mirror exits the beam splitter at a second face.

6. The head up display of claim 1, wherein the combiner is a waveguide, and the light from the image source enters and leaves the waveguide on a same side of the waveguide.

7. The head up display of claim 1, wherein the combiner is a waveguide having diffractive gratings.

8. The head up display of claim 1 further comprising a fold prism disposed between the lens and the image source, the lens being a field lens.

9. The head up display of claim 1 further comprising a corrective lens between the beam splitter and the combiner wherein the optical system is a catadioptric system.

10. A method of providing information to a pilot, the method comprising:
    providing light from an image source to a field lens;
    providing light from the field lens through a polarizing beam splitter to a collimating mirror;
    providing light from the collimating mirror through the polarizing beam splitter to a corrective lens;
    providing light from the corrective lens as collimated light to a waveguide; and
    folding the light from the image source before the field lens.

11. A method of providing information to a pilot, the method comprising:
    providing light from an image source to a field lens;
    providing light from the field lens through a polarizing beam splitter to a collimating mirror;
    providing light from the collimating mirror through the polarizing beam splitter to a corrective lens;
    providing light from the corrective lens as collimated light to a waveguide; and
    diffracting the collimated light into the waveguide.

12. The method of claim 11, further comprising folding the light from the image source before the field lens.

13. The method of claim 12, wherein the polarizing beam splitter includes two retarder films.

14. The method of claim 11, further comprising:
    diffracting light out of the wave guide.

15. A catadioptric optical system for a head up display including an image source, the optical system comprising:
    a first lens;
    a polarizing beam splitter;
    a collimating mirror;
    a corrective lens;
    a substrate waveguide combiner; and
    a fold optical device between first lens and the image source.

16. A catadioptric optical system for a head up display including an image source, the optical system comprising:
    a first lens;
    a polarizing beam splitter;
    a collimating mirror;
    a corrective lens; and
    a substrate waveguide combiner, wherein the corrective lens provides collimated light to a diffraction grating on the substrate waveguide combiner.

17. The system of claim 16, further comprising a fold prism between the first lens and the image source.

18. A catadioptric optical system for a head up display including an image source, the optical system comprising:
 a first lens;
 a polarizing beam splitter;
 a collimating mirror; and
 a corrective lens, wherein the optical system is an on axis arrangement; and a substrate waveguide combiner, wherein the corrective lens provides collimated light to a diffraction grating on the substrate waveguide combiner.

19. The system of claim 18, further comprising a fold prism between the first lens and the image source.

20. The system of claim 18, wherein an exit pupil for the optical system is at least three inches wide.

* * * * *